US008292105B1

(12) United States Patent
Gretz

(10) Patent No.: US 8,292,105 B1
(45) Date of Patent: Oct. 23, 2012

(54) RECESSED LOW VOLTAGE MOUNTING BRACKET

(75) Inventor: Thomas J. Gretz, Port St. Lucie, FL (US)

(73) Assignee: Arlington Industries, Inc., Scranton, PA (US)

( * ) Notice: Subject to any disclaimer, the term of this patent is extended or adjusted under 35 U.S.C. 154(b) by 204 days.

(21) Appl. No.: 12/661,077

(22) Filed: Mar. 10, 2010

(51) Int. Cl.
*H02G 3/08* (2006.01)
(52) U.S. Cl. .......................................... 220/3.7; 220/3.2
(58) Field of Classification Search .................... 220/3.2, 220/3.5, 3.6, 3.7, 3.9; 174/66, 520, 542
See application file for complete search history.

(56) References Cited

U.S. PATENT DOCUMENTS

| 2,031,861 A * | 2/1936 | Simek ........................... 220/3.6 |
| 4,098,423 A * | 7/1978 | Marrero ........................ 220/3.6 |
| 7,307,212 B1 * | 12/2007 | Gretz ............................. 174/53 |

FOREIGN PATENT DOCUMENTS

GB        2243181        * 10/1991

* cited by examiner

*Primary Examiner* — Stephen Castellano

(57) ABSTRACT

A recessed low voltage mounting bracket including: a) generally rectangular body having opposing sides, a top and a bottom, an open front and a rear wall including a rear wall opening that is smaller than the open front; b) an orthogonal peripheral flange about the rear wall opening having top and bottom portions; and c) at least one removable snap-in knockout that engages at least one of the top or bottom portions. The mounting bracket may include rotating flags attached to bolts that are rotatably located in apertures in the peripheries of the open front and the face plate such that rotation of the bolts causes the flags to rotate from a position parallel to the orthogonal peripheral flange to a position generally orthogonal thereto to engage a wall into which the mounting bracket is mounted.

5 Claims, 4 Drawing Sheets

RECESSED LOW VOLTAGE MOUNTING BRACKET

FIELD OF THE INVENTION

The present invention relates to electrical mounting brackets and more particularly to mounting brackets for low voltage wiring.

BACKGROUND OF THE INVENTION

Mounting brackets for conventional voltage electrical wiring are well known, as are mounting brackets for low voltage wiring. Most, if not all, low voltage mounting brackets include some form of device for the retention of low voltage wiring within the footprint of the mounting bracket such as a modified electrical box or the like.

While such devices are entirely suited to their particular application, their structure may not allow for the acceptance and retention of clusters of low voltage wiring of differing sizes or numbers of wires, or may be such that low voltage wiring approaching the bracket from different directions must be extended, bent significantly to provide engagement therewith by the mounting bracket or left in disarray for lack of some means to retain the low voltage wiring in some form of order.

OBJECT OF THE INVENTION

It is therefore an object of the present invention to provide a recessed low voltage mounting bracket that is readily adaptable to new or old construction, and can accept low voltage wiring bundles of varying sizes that approach the mounting bracket from differing directions without excessive bending or extension thereof all while maintaining such wires in orderly bunches.

It is another object of the present invention to provide a low voltage mounting bracket that while providing flexibility in terms of the number and direction of receipt of low voltage wires provides secure positioning thereof within the mounting bracket.

SUMMARY OF THE INVENTION

According to the present invention, there is provided a recessed low voltage mounting bracket comprising: a) generally rectangular body having opposing sides, a top and a bottom an open front and a rear wall including a rear wall opening that is smaller than the open front; b) an orthogonal peripheral flange about the rear wall opening having top and bottom portions; and c) at least one removable snap-in knockout that engages at least one of the top or bottom portions. Optimally, the recessed mounting bracket includes an open face plate about the open front that is retained in position by screws or the like that penetrate apertures in the periphery of the face plate and engage apertures in the periphery of the open front. According to a further preferred embodiment, the mounting bracket includes rotating flags attached to bolts that are rotatably located in apertures in the peripheries of the open front and the face plate such that rotation of the bolts causes the flags to rotate from a position parallel to the orthogonal peripheral flange to a position generally orthogonal thereto to engage a wall into which the mounting bracket is mounted.

DETAILED DESCRIPTION

Figure 1:
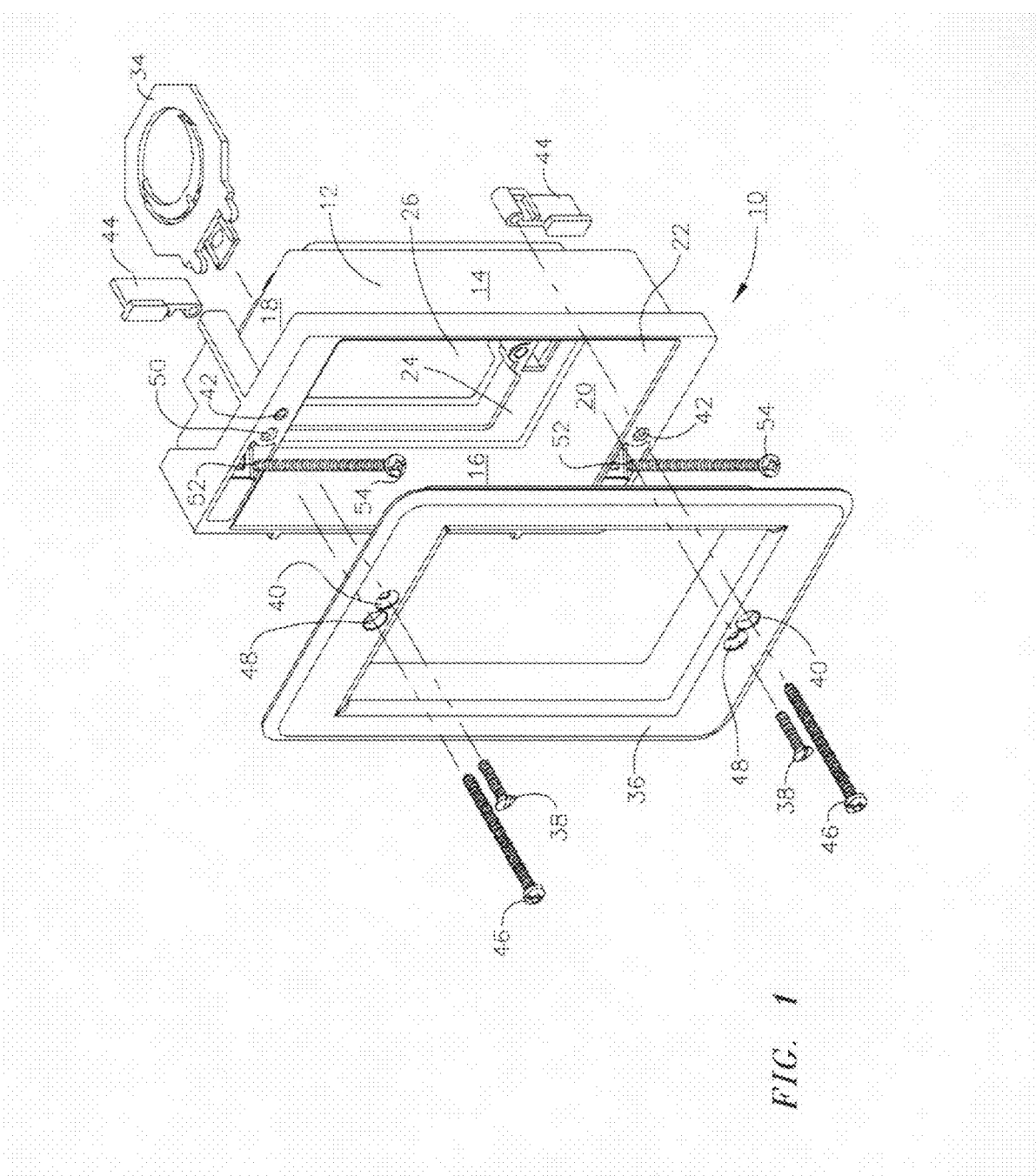
FIG. 1 is a front exploded view of the recessed low voltage mounting bracket of the present invention.

Referring now to the accompanying drawings, the recessed low voltage mounting bracket 10 of the present invention comprises: a) generally rectangular body 12 having opposing sides 14 and 16, a top 18 and a bottom 20 an open front 22 and a rear wall 24 including a rear wall opening 26 that is smaller than open front 22; b) an orthogonal peripheral flange 28 about the rear wall opening 26 having top and bottom portions 30 and 32; and c) at least one removable snap-in knockout 34 that engages at least one of top or bottom portions 30 and 32.

Optimally, recessed mounting bracket 10 includes an open face plate 36 about open front 22 that is retained in position by screws 38 or the like that penetrate apertures 40 in the periphery of face plate 36 and engage apertures 42 in the periphery of open front 22.

To facilitate installation in old construction, mounting bracket 10 includes rotating flags 44 attached to bolts 46 that are rotatably located in apertures 48 and 50 in the peripheries of open front 22 and face plate 36 such that rotation of bolts 46 causes flags 44 to rotate from a position parallel to orthogonal peripheral flange 28 to a position generally orthogonal thereto to engage a wall or wall board (not shown) into which mounting bracket 10 is mounted.

According to an alternative preferred embodiment depicted in FIG. 1 recessed mounting bracket 10 also includes angularly disposed apertures 52 for receipt of screws 54 which, after passage through angularly disposed apertures 52 will penetrate a stud or the like (not shown) for securing recessed low voltage mounting bracket 10 to a structure as an alternative to securing it using flags 44 as described above. Such an installation would be more appropriate for new construction as opposed to the use of flags 44 as would be appropriate for an old construction installation.

Figure 2:
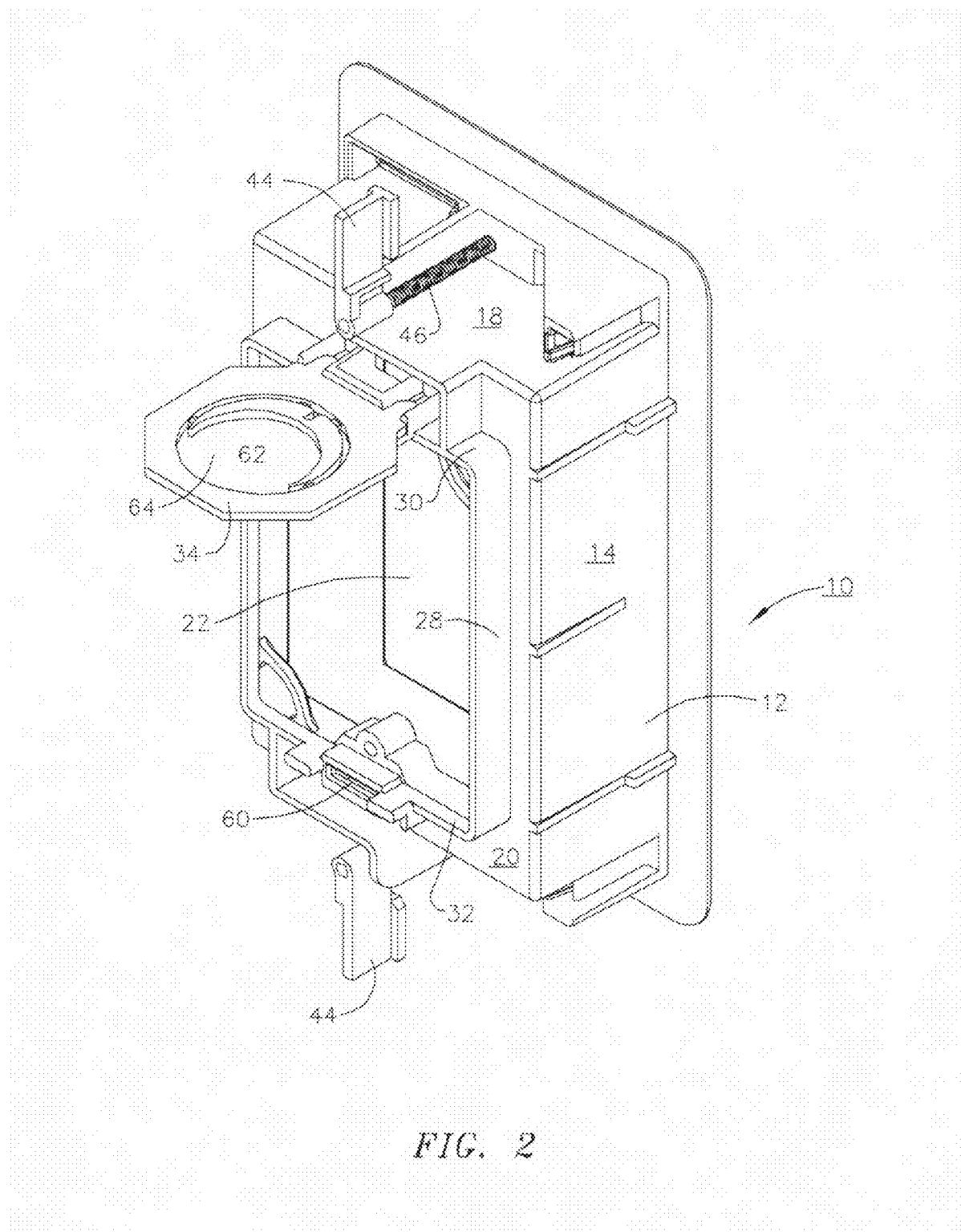
FIG. 2 is a rear perspective assembled view of the recessed low voltage mounting bracket of the present invention.
Figure 3:
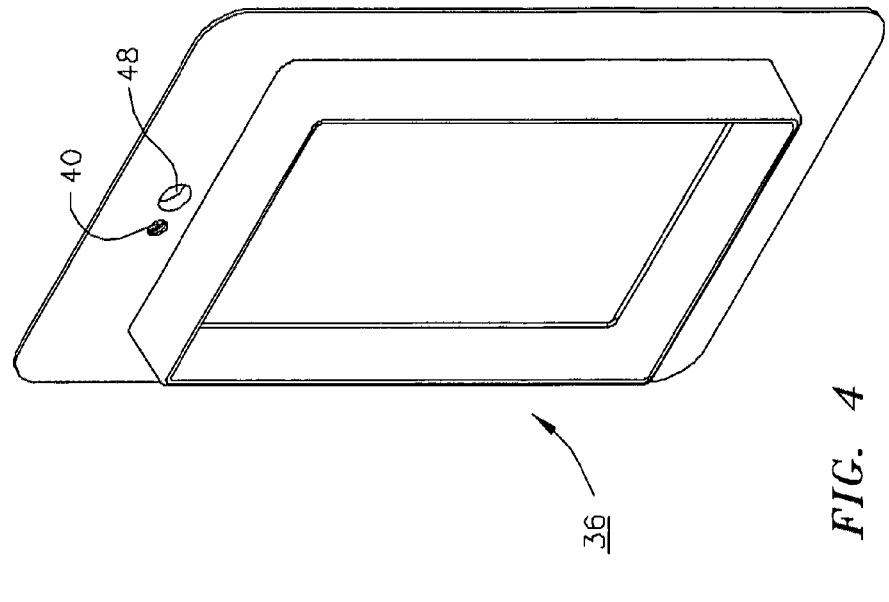
FIGS. 3 and 4 are perspective front and rear views respectively of the face plate of the recessed low voltage mounting bracket of the present invention.
Figure 4:
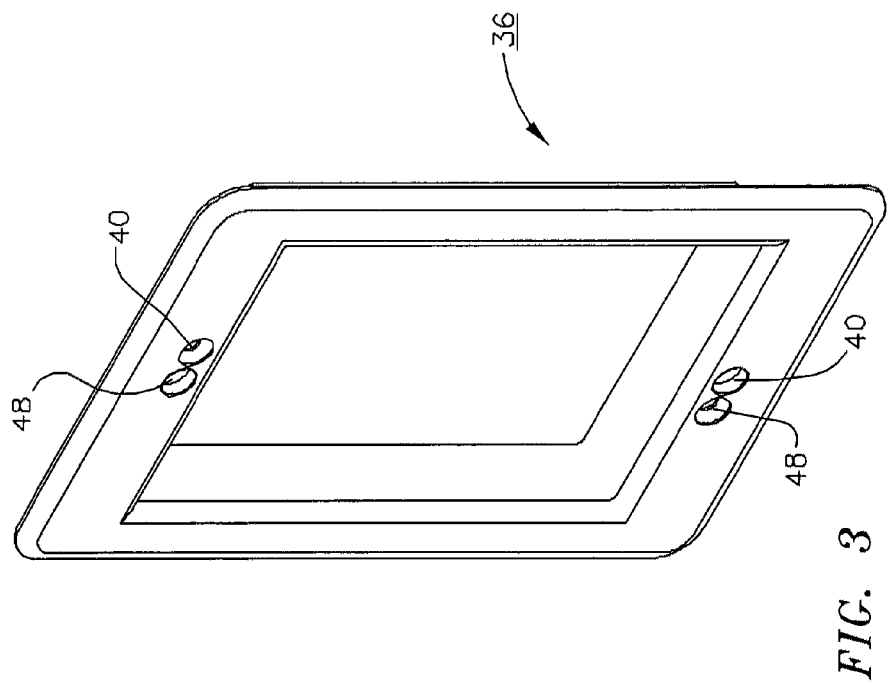
Figure 5:
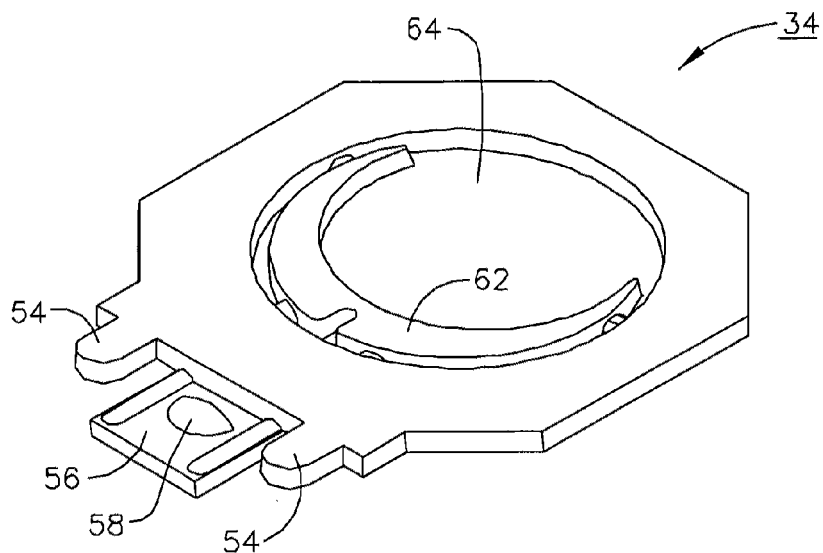
FIGS. 5 and 6 are bottom and top perspective views respectively of the snap-in knock outs used in the recessed low voltage mounting bracket of the present invention.
Figure 6:
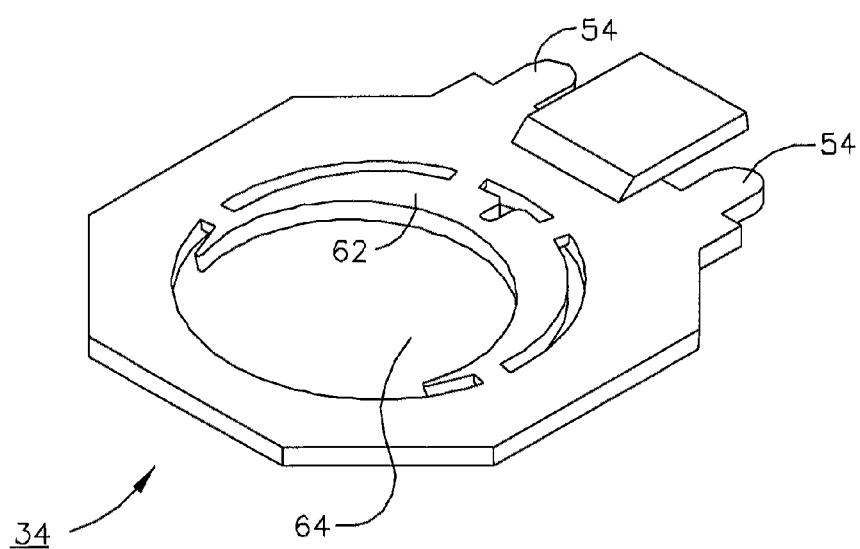

Removable snap-in knockout(s) 34 (best seen in FIGS. 5 and 6) include a mechanism for securing them to recessed low voltage mounting bracket 10. This mechanism includes a pair of horizontally displaced tabular structures 54 and 56 suitable for engagement with top and bottom portions 30 and 32 having a thickness slightly greater than the displacement of tabular structures 54 and 56. Tabular structure 56 preferably is slightly flexible and includes a raised tab or a depression 58 that engages a mating structure 60 (a mating raised lip tab or depression) in top and bottom portions 30 and 32 as best seen in FIG. 2.

Clearly, removable snap-in knockout(s) 34 include a knockout portion 62 that can be left in place or removed to accommodate varying quantities of low voltage wire in aperture 64 in removable knockout 34.

There has thus been described a novel and highly useful recessed low voltage mounting bracket that can be installed in new or old construction and provides secure and orderly location of low voltage wiring installed therein.

As the invention has been described, it will be apparent to those skilled in the art that the same may be varied in many ways without departing from the intended spirit and scope of the invention, and any and all such modifications are intended to be included within the scope of the appended claims.

What is claimed is:

1. A recessed low voltage mounting bracket comprising:
 a) a generally rectangular body having an interior space, opposing side wall, a top and a bottom, an open front and a rear wall including a rear wall opening that is smaller than the open front and having a periphery including a top and a bottom rear peripheral portion;
 b) an orthogonal peripheral flange about the rear wall opening and extending away from said interior space having top and bottom portions; and
 c) at least one removable snap-in knockout that engages at least one of the top or bottom portions of said peripheral flange.

2. The recessed low voltage mounting bracket of claim 1 wherein the at least one removable snap-in knockout that engages at least one of the top or bottom portions includes a pair of horizontally displaced tabular structures displaced a distance about equal to or slightly greater than the thickness of the top and bottom portions, at least one of the tabular structures being somewhat flexible and including a raised portion or a depression that engages a mating structure on the top or bottom portion to secure the removable snap-in knockout to the top or bottom portion.

3. The recessed low voltage mounting bracket of claim 2 further including rotating flags attached to bolts penetrating the rear top and bottom peripheral portions such that rotation of the bolts turns said flags from a position parallel to the orthogonal flange to a position orthogonal to the orthogonal flange to engage the rear of a wall into which the recessed low voltage mounting bracket is installed.

4. The recessed low voltage mounting bracket of claim 3 further including angularly disposed apertures in at least one of the opposed side walls for the insertion of fasteners to secure the recessed low voltage mounting bracket to a structural member of a structure into which the recessed low voltage mounting bracket is being installed.

5. The recessed low voltage mounting bracket of claim 4 further including a removable front plate having an opening and a periphery that is secured to the generally rectangular body by fasteners inserted into apertures in the periphery and the top and bottom of the generally rectangular body.

* * * * *